M. J. RAHILLY.
Saw-Teeth.

No. 146,708. Patented Jan. 20, 1874.

WITNESSES:
P. C. Dieterich
Harry C. Scott

INVENTOR
Maurice J. Rahilly
per C. H. Watson & Co.
ATTORNEYS.

UNITED STATES PATENT OFFICE.

MAURICE J. RAHILLY, OF BEAVER FALLS, PENNSYLVANIA, ASSIGNOR TO HIMSELF AND JOHN E. COYLE, OF SAME PLACE.

IMPROVEMENT IN SAW-TEETH.

Specification forming part of Letters Patent No. 146,708, dated January 20, 1874; application filed January 2, 1874.

*To all whom it may concern:*

Be it known that I, MAURICE J. RAHILLY, of Beaver Falls, in the county of Beaver and State of Pennsylvania, have invented certain new and useful Improvements in Saw-Teeth; and I do hereby declare that the following is a full, clear, and exact description thereof, reference being had to the accompanying drawings and to the letters of reference marked thereon, which form a part of this specification.

The nature of my invention consists in the construction of a removable saw-tooth for circular saws, and in the means for fastening the same to the saw-plate, as will be hereinafter more fully set forth; the object being to form a tooth that shall be easily inserted and removed from the saw-plate, and, when inserted, be easily and securely fastened in its position.

In order to enable others skilled in the art to which my invention appertains to make and use the same, I will now proceed to describe its construction and operation, referring to the annexed drawing, in which—

Figure 1:
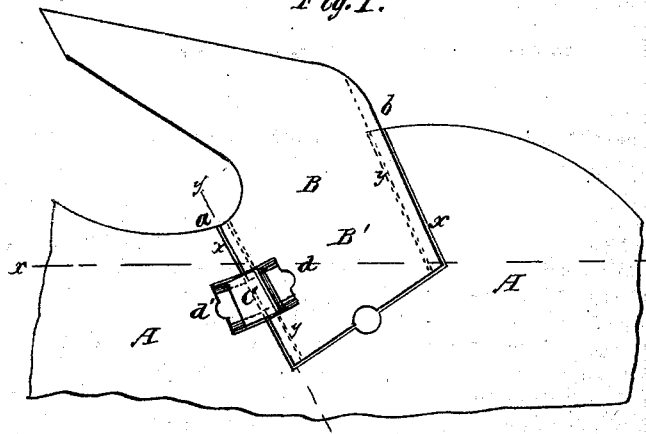
Figure 2:
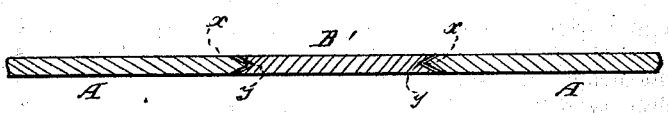
Figure 3:
Figure 4:

Figure 1 is a plan view of my invention. Fig. 2 is a transverse section on line $x\,x$, Fig. 1. Fig. 3 is a cross-section on line $y\,y$, Fig. 1. Fig. 4 is a perspective view of the fastening device.

A represents a portion of the saw-plate of a circular saw, and B represents one of the removable teeth in the same. That part marked B′ of the tooth B, which enters the saw-plate, has two parallel sides, $a$ and $b$, in each of which there is a longitudinal V-shaped groove, $y$. In the saw-plate A is made an aperture, corresponding in size and shape with the part B′ of the tooth, and the edges $x$ of the two parallel sides of this aperture are V-shaped to fit in the grooves in the edges $a\,b$ of the tooth; or, in other words, the grooved edges of the tooth fit over and slide on these V-shaped edges $x\,x$. By this construction of the tooth with parallel edges it can be easily inserted and removed when desired. In the side $a$ of the tooth, from the edge inwardly for a suitable distance, is a slot, $d$, the sides of which are made V-shaped. A corresponding slot, $d'$, is made in the saw-plate A, the ends of the two slots $d$ and $d'$ coming directly opposite each other when the tooth B is inserted in its place; but the slots stand not on line with each other, but form a slight angle, as shown. In the slot $d'$ in the saw-plate is a slide, C, having V-shaped grooves in its edges to fit on the V-shaped edges of the slot. After the tooth has been inserted in the saw-plate this slide is moved so as to partly enter the slot $d$ in the saw-tooth. The slot $d$ being at an angle with the slot $d'$, as above described, the slide C, in entering the slot $d$, acts as a wedge to hold the tooth in place.

When it is desired to remove the tooth, the slide C is easily moved entirely out of the slot $d$.

Having thus fully described my invention, what I claim as new, and desire to secure by Letters Patent, is—

The combination of the tooth B, saw-plate A, slots $d\,d'$, set at an angle with each other, and the slide C, all substantially as and for the purposes herein set forth.

In testimony that I claim the foregoing as my own I affix my signature in presence of two witnesses.

MAURICE J. RAHILLY.

Witnesses:
JOHN E. COYLE,
DANL. M. DAUGHERTY.